Patented Oct. 28, 1941

2,260,380

UNITED STATES PATENT OFFICE 2,260,380

ACCELERATOR OF VULCANIZATION

Paul C. Jones, Akron, Ohio, assignor to The B. F. Goodrich Company, New York, N. Y., a corporation of New York No Drawing. Application May 22, 1940, Serial No. 336,580

3 Claims. (Cl. 260—302)

This invention relates to the art of rubber manufacture and to a new class of compounds which have been found useful as accelerators of vulcanization.

The class of aminated esters of sulfhydryl compounds having the structural formula

wherein $R_1$ represents an organic radical having the free valence on a carbon atom, $R_2$ represents a member of the class consisting of hydrogen, hydrocarbon groups and $R_1$—S—A— groups, and A represents a lower alkylene group, is known. I have now discovered that these compounds may be reacted with aliphatic aldehydes to produce active accelerators of vulcanization.

The aminated esters which enter into the reaction with the aliphatic aldehyde may be grouped according to the sulfhydryl compounds from which they may be derived. Thus when aminated esters of hydrocarbon mercaptans are employed, $R_1$ represents methyl, ethyl, isopropyl, allyl, cyclohexyl, benzyl, phenyl, tolyl, naphthyl, etc.

In aminated esters derived from carbothiolic and carbodithoic acids, $R_1$ represents methanecarbothionyl, acetyl, ethanecarbothionyl, benzenecarbothionyl, 3-furoyl, 3-furanecarbothionyl, etc.

When aminated esters of dithiocarbamic acids are employed, $R_1$ represents dimethylthiocarbamyl, diethylthiocarbamyl, methyl-ethylthiocarbamyl, methyl-phenylthiocarbamyl, dicyclohexylthiocarbamyl, dibenzylthiocarbamyl, diphenylthiocarbamyl, phenyl-beta-naphthylthiocarbamyl, di-alpha-naphthylthiocarbamyl, etc.

Aminated esters of mercapto-azoles and mercapto-azolines may also be employed, in which case $R_1$ represents benzothiazyl, naphthothiazyl, 4,5-dimethylthiazyl, 4-phenylthiazyl, 4,5-dimethyloxazyl, 4,4-diethylimidazyl, thiazolinyl, 4-methyl-5-ethylthiazolinyl, oxazolinyl, imidazolinyl, etc.

$R_2$ may represent hydrocarbon groups such as methyl, ethyl, isopropyl, cyclohexyl, benzyl, phenyl, tolyl, naphthyl, etc. as well as hydrogen and $R_1$—S—A— groups.

A represents a lower alkylene group such as methylene, ethylene, propylene, butylene, propylidene, etc.

Although formaldehyde is preferably employed in the reaction of this invention, other aliphatic aldehydes such as acetaldehyde, butyraldehyde, heptaldehyde, alpha-ethylhexenal, etc., may be reacted with aminated esters of sulfhydryl compounds to produce good accelerators. When two hydrogen atoms are present on the amino nitrogen of the aminated ester, equimolar or semimolar proportions of aldehyde may enter into the reaction, while only semimolar proportions of aldehyde enter into the reaction with aminated esters having only one hydrogen on the amino nitrogen. The proportions of reactance employed are not critical, however, and an excess of either reagent may be present in the reaction without greatly influencing the activity of the product as an accelerator.

As a specific example of this invention, 23 gms. of thiazolinylthiomethyl cyclohexyl amine melting at 95° C. were suspended in water, 10 cc. of 37% formalin solution added, and the mixture was gradually heated to 90° C. with stirring. After a short time, the reaction mixture was cooled, and the white crystals which separated were filtered off, dried, and found to have a melting point of 147° C. It it believed that the reaction occurs according to the following stoichiometric equation:

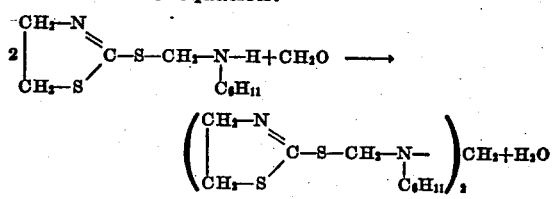

1 part by weight of the crystalline product was incorporated in a composition containing 100 parts of rubber, 3.5 parts of sulfur, and 5 parts of zinc oxide. This composition attained a tensile strength of 3360 lbs./in.² and an ultimate elongation of 840% when vulcanized in a heated mold for 15 min. at 287° F., and a tensile strength of 3940 lbs./in.² and an ultimate elongation of 795% in 30 min. under the same conditions. Although thiazolines in general must be activated by fatty acid, it will be observed that no fatty acid is necessary to activate the accelerators of this invention. Other products within the scope of the invention such as those formed by the reaction of benzothiazylthiomethyl cyclohexyl amine or 4,5-dimethylthiazylthiomethyl cyclohexyl amine with formaldehyde may be employed as accelerators with comparable results.

It is to be understood that the specific examples given above are merely illustrative of one manner of the use of the accelerators of this invention; that other accelerators within the scope of the class herein defined may be substituted for the specific compounds used in the examples; that the accelerators of this invention may be used to vulcanize rubber broadly, including caoutchouc, balata, gutta percha, synthetic rubber, or natural or artificially prepared latex; that the accelerators may be incorporated in the rubber by mastication or milling, or in the case of latex or other dispersion or solution, by simply dissolving or suspending the accelerator therein; that the accelerators may be used in admixture with each other or with other known accelerators or with antioxidants, organic acids, amines, softeners, activators, retarders, pigments, fillers, etc.; and that the rubber may be vulcanized with the assistance of this new class of accelerators in heated molds, hot air, steam, hot water, etc. The accelerators of this invention may advantageously be used in as low a proportion as 0.05% of the rubber in the composition, in which case 3 to 5% of sulfur is generally required, or as high as 5%, with a much reduced quantity of sulfur.

The invention is accordingly not limited to the specific examples herein set forth, for it will be obvious to those skilled in the art that many modifications such as using other materials having equivalent properties and varying the proportions of materials used are within the spirit and scope of the invention as defined in the appended claims.

I claim:

1. The reaction product of formaldehyde and thiazolinylthiomethyl cyclohexyl amine.

2. Reaction products of formaldehyde and a compound having the structural formula

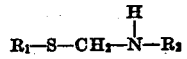

wherein $R_1$ represents an organic radical having the free valence on a carbon atom, and $R_2$ represents a hydrocarbon group.

3. Reaction products of an aliphatic aldehyde and a compound having the structural formula

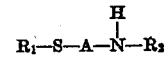

wherein $R_1$ represents an organic radical having the free valence on a carbon atom, $R_2$ represents a member of the class consisting of hydrogen, hydrocarbon groups, and $R_1$—S—A— groups, and A represents a lower alkylene group.

PAUL C. JONES.